United States Patent Office 3,206,312
Patented Sept. 14, 1965

3,206,312
PHOTOGRAPHIC FILM HAVING ANTISTATIC AGENT THEREIN
Melvin D. Sterman and Louis M. Minsk, Rochester, N.Y., assignors to Eastman Kodak Company, Rochester, N.Y., a corporation of New Jersey
No Drawing. Filed June 12, 1962, Ser. No. 201,808
10 Claims. (Cl. 96—87)

This invention relates to antistatic products comprising a support having thereon a conducting layer containing a substantial proportion of a water-soluble salt of a carboxy ester-lactone of an interpolymer of alpha-beta-dicarboxylic acid (or anhydride) and a vinyl ester of a carboxylic acid.

In the manufacture and processing of a great many materials in film or fiber form, numerous problems are encountered due to the development of static electricity. These problems are especially troublesome with photographic products. In the case of photographic films, particularly those coated with relatively high-speed photographic emulsion, it is necessary to provide some means of retarding or eliminating the formation of static electricity. Unless this protection is provided, static discharges are prone to occur during the manufacture and use of the film, generating light which fogs the film and results in static marks upon development.

Certain conductive materials have been suggested for use as antistatic layers in photographic products but many of them have disadvantages. They may exhibit such difficulties as poor adhesion to the support; poor mechanical properties which give brittle films which easily crack, flake, or peel; inadequate conductivity; or they may not be readily removable at some stage where this is desirable.

One object of our invention is to provide a new product having the property of preventing static build-up in manufacture and use. Another object of our invention is to provide a material having antistatic properties which also has other desirable properties. A further object of our invention is to provide a material which in certain solvent combinations is coated directly upon film base or adheres satisfactorily to film base by means of intermediate or sub layers which are readily adherent to the film base. Other objects of our invention will appear herein.

We have found that the water-soluble salts of the carboxy ester-lactones of the interpolymers of unsaturated alpha-beta-dicarboxylic acids or their anhydrides and vinyl carboxylic acid esters are useful in preventing static build-up in photographic products, these salts ordinarily being alkali metal, or ammonium salts. The salts used may be those of the polymers which result from the reaction of an aliphatic monohydric hydroxy carboxylic acid and a monohydric alkanol containing 1-12 carbon atoms with, for example, an interpolymer of vinyl acetate and maleic anhydride as described in U.S. Patent No. 3,007,901 of Louis M. Minsk. They also may be salts of carboxy ester-lactones prepared by the partial hydrolysis of the essentially fully esterified polymers as described by McNally and Van Dyke in U.S. Patent 2,306,071, or, alternatively, they may be salts of carboxy ester-lactones prepared directly by heating in the presence of a mineral acid a mixture consisting of a low-viscosity interpolymer of a vinyl organic acid ester and an unsaturated alpha-beta-dicarboxylic acid or its anhydride, water, and an aliphatic alcohol in such a ratio as to provide a polymer containing the desired carboxyl content. The usable carboxy content of the carboxy ester-lactone polymers lies between approximately 3.5 and 6 milliequivalents per gram or polymer, preferably between 4.5 and 5.5 milliequivalents per gram, with the optimal value at approximately 5.0 milliequivalents per gram. The salt is conveniently prepared by reacting the carboxyl-containing polymer with an alkaline material such as sodium carbonate, sodium hydroxide, ammonium hydroxide, or the like so that it is 25–98% (optimally 50–95%) neutralized by the alkali metal or ammonium ion as disclosed in pending U.S. application Serial No. 145,435.

The materials employed in preparing products in accordance with our invention may be prepared by the steps of (a) first heating to reacting temperature, under acid conditions, a heteropolymer of a vinyl or isopropenyl organic acid ester and an unsaturated alpha-beta-dicarboxylic acid with a mixture of a monohydric hydroxy acid, a monohydric alkanol, water and an inert solvent, to obtain a resinous carboxy ester-lactone having substantial proportions of each of the following recurring structural units:

(1) 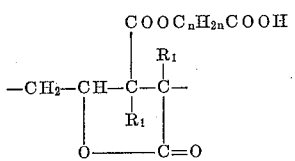

(2) 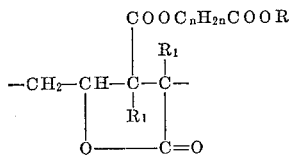

(3) 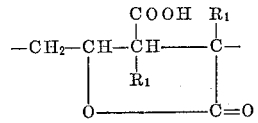

and (4) 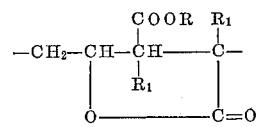

wherein $n$ represents an integer of 1–5, R represents an alkyl group containing 1–12 carbon atoms e.g. methyl, ethyl, propyl, isopropyl, etc., or a phenyl-alkyl group wherein the alkyl contains 1–4 carbon atoms e.g. benzyl, phenylethyl, phenylpropyl, etc. or the corresponding tolyl-alkyl groups and $R_1$ represents a hydrogen atom or methyl (thus the product can be defined as a mixed carboxyalkyl ester of a monohydric hydroxy acid and monohydric alkanol of a lactone of an interpolymer of vinyl alcohol and an unsaturated alpha-beta-dicarboxylic acid) and (b) dispersing the isolated resinous carboxy ester-lactone in an appropriate solvent such as acetone, adjusting the pH to 5–8 or preferably 6–7 with an aqueous solution of a base whereby the inherently hydrophobic, unneutralized resinous carboxy ester-lactone essentially prepared is converted to the inherently hydrophilic salt of the resinous carboxy ester-lactone wherein the original lactone rings remain substantially intact, 25–98% (optimally 50–95%) of the hydrogen of the carboxyl groups having been replaced by the ammonium radical or alkali metal atom. Suitable alkaline reagents for use in this latter step include ammonium hydroxide and the alkali metal hydroxides of lithium, sodium, and potassium. In preparing the intermediate interpolymers used in preparing these materials, the usual and preferred practice is to employ the anhydride of the acid rather than the free dicarboxylic acid itself. It will be understood that where reference herein is made to the unsaturated alpha-beta-dicarboxylic acid, it is intended that the corresponding anhydride be included.

Typical starting interpolymers in step (a) referred to are those prepared from an unsaturated alpha-beta-dicarboxylic acid or its anhydride, such as maleic acid, citraconic acid, dimethylmaleic acid, or anhydrides or 1–4 carbon alkyl esters thereof, fumaric acid, mesaconic acid, dimethylfumaric acid or 1–4 carbon alkyl esters thereof, or similar well-known dicarboxylic acid and vinyl organic acid ester such as vinyl acetate, vinyl propionate, vinyl benzoate or the like. The monohydric hydroxy acids preferred are selected from the lactic acid series such as glycolic acid, lactic acid, hydroxybutyric acid and the like and the monohydric hydroxy alkanols include methanol, ethanol, propanol or the like up to and including the alcohols of 12 carbon atoms. The reaction in preparing these products is carried out in the presence of a strong acid catalyst such as a mineral acid having an acidity of the order of sulfuric acid.

The conducting salt may be applied in accordance with our invention to the support either alone or mixed with another polymeric material such as gelatin or the like. In a photographic element it may be positioned in a great variety of locations to act as an antistatic backing layer, an anticurling layer, an antihalation layer, a conducting layer under, over, or between emulsion layers, or as an addend to the photographic emulsion. It may be incorporated into a photographically sensitive product as an antistatic layer to protect the product during manufacture or use, or it may be applied to a developed material to protect the final product against dust accumulation.

Our conducting polymers are soluble in water but will tolerate large amounts of organic water-soluble solvents. They may thus be applied either from water to a support supplied with a suitable subbing layer or they may be applied from a mixture of water and organic solvents so adjusted as to have sufficient solvent action on the support to provide good adhesion of the conducting layer. With most film supports, acetone has this effect of promoting adhesion. If, for instance, the support to be employed is cellulose triacetate sheet, convenient compositions for use in applying a layer directly to the base may be composed of 0.1–0.5% of the conducting polymeric salt dissolved in a solution of 25–70% acetone, 15–30% water, and 0–60% methanol. In cases where the composition contains less than 50% acetone, a surface-active agent might be used to give the desired degree of wetting of the film. Similar coating solvent combinations also give satisfactory results on polystyrene and polycarbonate film bases.

While direct application of our conducting layers to a film support is preferred for many applications, they may also be applied to support bearing subbing layers. When a subbing layer is desired, any polymeric material which readily adheres to the film support used and to which the conducting polymeric salt will adhere is useful. One group of materials that works very effectively as subbing layers is the carboxy ester-lactones of the interpolymers of maleic anhydride and vinyl acetate. These may be coated, for example, onto the support from a solvent mixture of methylene chloride, acetone, and ethanol. The conducting polymeric salts may then be overcoated from solutions composed of 10–100% water and 90–0% of methanol. Other polymeric materials such as gelatin, acrylates, or methacrylates, or copolymers of acrylates and methacrylates with acrylic and alpha-substituted acrylic acids are useful for subbing layers. Unlike most ionic polymers, the alkali metal and ammonium salts of the carboxy esterlactones of the maleic anhydride and vinyl acetate interpolymers, when cast onto a support yield coatings which are clear, flexible and tough. Though hydrophilic in character, they do not become tacky at high relative humidities.

Our conducting polymeric salts are soluble in aqueous solutions and when coated as described above remain soluble during drying and storing and used in photographic products are readily removable by aqueous solutions during processing. In certain applications where such solubility is undesirable, such as when coated in an anticurl layer or under or in an emulsion layer, our conducting polymeric salts may be rendered insoluble by the inclusion of a hardener which has the effect of insolubilizing carboxyl-containing polymers. Such hardeners include aziridines such as triethylenemelamine, tris-[1 - (2 - methylaziridinyl)]phosphine oxide, hexa[1-(2-methylaziridinyl)]triphosphatriazine, ethylene bis[N,N-(1,2-propylene)urethane], hexamethylene 1,6-bis[3,3-ethylene urea] and mesitylene-2,4,6-tris[3,3-ethylene urea]; and epoxides such as butane-1,4-diol bis(glycidyl ether), vinylcyclohexene dioxide, resorcinol diglycidyl ether, bis[2,3-epoxypropyl]propylamine, and bis[2,3-epoxypropyl]ethylmethyl-ammonium p-toluenesulfonate. In this insoluble form our conducting polymeric salts retain their excellent physical properties and electrical conductivity. When our conducting polymeric salts are used in admixture with other polymeric materials, such as with gelatin or the like, the conducting material should constitute at least 15% of the solids to provide suitable antistatic protection.

As mentioned earlier, other conducting polymers have shown numerous disadvantages when used as antistatic layers. Some of these have been insolubilized with a hardener as described above and their physical properties were improved. Included among such conducting polymers are: (1) alkali metal and ammonium salts of other carboxy-containing polymers such as the terpolymers of vinyl phthalate, vinyl acetate and vinyl alcohol, cellulose derivatives such as carboxymethyl cellulose and ethyl cellulose phthalate, copolymers of acrylate esters and acrylic acid, or methacrylate esters and methacrylic acid, polyacrylic acid, polymethacrylic acid, copolymers of acrylic acid and acrylamide, copolymers of maleic acid with styrene or ethylene, poly(vinylcarboxy ester acetals and butals), alginic acid, copolymers of acrylic acid and itaconic acid, and polyitaconic acid, and (2) quaternary ammonium polymers such as poly-4-vinylpyridine quaternized with dimethylsulfate and poly-beta-dimethylaminoethyl methacrylate quaternized with dimethylsulfate.

In coating the conducting layers in preparing products in accordance with our invention we have found that a useful range of pH of the coating solution is from 4.5–8, and that a pH of approximately 6–7 is preferred. The coating solutions may be employed in concentrations ranging from 0.1–10% of the conducting salt. Although solvent combinations of acetone, methanol, and water have been found to be particularly useful in coating directly onto the film base, and coating solutions composed of water and methanol have been found useful for coating onto subbing layers, other solvent combinations of evaporable liquids may be employed to give coatings with good adhesion and good cohesive properties. Optionally, surfactants which function as a coating aid may be included in the coating solutions. A wetting agent such as p-tert.-octylphenoxyethoxyethyl sodium sulfonate is eminently suitable. Instead of this surface-active agent, others which are commonly recognized as such may impart the desired wetting properties to the coating composition. For instance, disodium N-(carbo-p-tert.-octylphenoxypentaethoxy)-glutamate as described in Knox et al. application Serial No. 600,679 is useful for this purpose.

The following examples illustrate specific embodiments of our invention but should not be regarded as limiting.

*Example 1*

Cellulose triacetate film support was coated with a subbing layer by means of a solution at 0.2% concentration of a carboxy butyl ester-lactone of maleic anhydride-vinyl acetate interpolymer prepared as described in U.S. Patent No. 3,007,901 by modifying maleic anhydride-vinyl acetate interpolymer with glycolic acid and n-butyl alcohol. The solvent used was composed of 20 parts of methylene chloride, 55 parts of acetone, and 25 parts of ethanol. The coating composition was applied to the film support by the bead method of application. The thus subbed support was overcoated with a solution of the sodium salt of the carboxy butyl ester-lactone of maleic anhydride-vinyl acetate interpolymer at 0.5% concentration using as the solvent a mixture of 60 parts of water and 40 parts of methanol. The pH of the solution was adjusted to 6. The thus formed product was found to have a surface resistivity of $10^9$ ohms per square inch at 50% relative humidity. The antistatic backing exhibited good adhesion, good abrasion resistance, good ferrotyping properties, and both the antistatic backing and the sub layer were completely removable in alkaline photographic developer solutions

Example 2

Cellulose triacetate film base support was coated with a sub layer by means of a solution of a copolymer of methacrylic acid and methyl acrylate at 0.2% concentration in a solvent consisting of 20 parts of methylene chloride,, 55 parts of acetone, and 25 parts of ethanol. The subbed support was overcoated with an aqueous solution of the sodium salt of the carboxy butyl ester-lactone of maleic anhydride-vinyl acetate interpolymer at a concentration of 0.5% having a pH of 6. The resulting coatings were found to have a surface resistivity of $10^9$ ohms per square inch at 50% relative humidity. The coating exhibited good adhesion to the support, and both the antistatic backing and the sub layer were completely removed in photographic developer solution.

Example 3

Cellulose triacetate film support was coated with a solution of the following composition: 0.2% of the sodium salt of the carboxy butyl ester-lactone obtained from glycolic acid, n-butyl alcohol, and a maleic anhydride-vinyl acetate interpolymer dissolved in a mixed solvent composed of 20% water, 50% methanol, and 29.8% acetone. The pH of the solution was adjusted to about 6. The solution was coated at a hopper and drum temperature of 100° F., and the coating was dried above 180° F. The coating had a surface resistivity of less than $10^9$ ohms per square inch at 50% relative humidity and exhibited excellent adhesion to the support, good abrasion resistance, and coefficient of friction, and was completely removable in alkaline developer solutions.

Example 4

Starting with an aqueous dope of the sodium salt of the carboxy butyl ester-lactone of maleic anhydride-vinyl acetate interpolymer at 10% solids, a coating solution was prepared having the following composition: 5% of the conducting material, 0.15% of triethylenemelamine, and 0.05% of p-tert.-octylphenoxyethoxy-ethyl sodium sulfonate, all in water; the pH of the solution was adjusted to 7. A cellulose triacetate film base was coated with a mixture of gelatin and cellulose nitrate in acetone-water solvent. This film support was then coated with the solution of conducting material by means of an extrusion hopper and dried by blowing hot air over the surface of the coating. This support was coated on the same side with a gelatin-silver halide photographic emulsion and then with a gelatin overcoat. A control was prepared in which the cellulose triacetate film base was coated with the gelatin-cellulose nitrate subbing layer and with the emulsion and gelatin overcoat but without the conducting material. Strips of both films were aged for seven days at 77° F. and 50% relative humidity. The appearance of each was excellent and each coating exhibited good dry and wet adhesion to the support. The sensitometric characteristics of the emulsion coated over the conducting material were equal to those for the control coating. However, whereas the emulsion surface resistivity at 50% relative humidity of the control coating in ohms per square inch was $15 \times 10^{10}$, the emulsion surface resistivity of the product in which the conducting coating was used was $0.013 \times 10^{10}$. Camera static tests performed on the coatings showed that the product embodying an application of the invention was much less susceptible to static markings than the control coating. In this test, five different 35 mm. cameras were used at 15% and 30% relative humidity. Also, the emulsion of the product using the antistatic material in accordance with our invention showed no edge static markings as a result of static electricity created during perforation of the film product. The control product was particularly edge marked during this process.

Example 5

The same antistatic coating composition as given in Example 4 was coated onto poly(ethylene terephthalate) film base, having a hydrosol coating and a gelatin overcoat, by means of a coating machine having an extrusion hopper and the coating was dried by blowing hot air thereon. Samples of the resulting conducting support were overcoated with different gelatin-silver halide photographic emulsions. Control products were also prepared without the conducting coating. Strips of the conducting support, the products with the conducting layer overcoated with photosensitized emulsion, and the controls were all aged for seven days at 77° F. and 50% relative humidity. The appearance of each coating was excellent and good dry and wet adhesion was exhibited in each. It was found that the products in which the antistatic layer was overcoated with photosensitive emulsion when physically tested were as good as or better than the controls. The surface resistivity of the support coated with the antistatic layer was $0.0024 \times 10^{10}$ ohms per square inch. When emulsion coated the surface resistivity ranged from $0.046 \times 10^{10}$ to $0.2 \times 10^{10}$. The surface resistivity values for the emulsion coated controls ranged from $13.0 \times 10^{10}$ to $480 \times 10^{10}$. All values were measured at 50% relative humidity.

Example 6

Starting with the aqueous dope described in Example 4, a coating solution was prepared consisting of an aqueous solution containing 5% of the sodium salt of the carboxy butyl ester-lactone of maleic anhydride-vinyl acetate interpolymer, 0.15% of hexa[1-(2-methylaziridinyl)] triphosphatriazine as a hardener therein and 0.05% of p-tert.-octylphenoxyethoxyethyl sodium sulfonate. The pH was adjusted to 7. This solution was coated onto a gel-subbed cellulose triacetate film support in the manner described in Example 4. This support was then overcoated with a gelatin-silver halide photographic emulsion. A control product was prepared of like type except that the antistatic layer was omitted. Strips of the antistatic coated film base and of the two emulsion coated products were aged for seven days at 77° F. and 50% relative humidity. The coatings were excellent and all exhibited good dry and wet adhesion. Thorough physical testing of the coatings indicated that the products having the static coatings were as good as or better than those of the control. The film base coated with the antistatic coating had a surface resistivity of $0.0023 \times 10^{10}$ ohms per square inch. The surface resistivity of the product utilizing the antistatic coating in accordance with our invention was $0.2 \times 10^{10}$ ohms per square inch and that of the control product was $59 \times 10^{10}$. These values were measured at 50% relative humidity.

Example 7

Employing the antistatic coating dope of Example 6 mixed with 12% by weight of Titanox as a filler based on the sodium salt of the carboxy butyl ester-lactone, a coating was applied from a hopper to the reverse side of paper stock coated with a photo-sensitive emulsion at such a rate as to provide adequate anticurl protection. The resistivity of this coating after aging for a week was $8.6 \times 10^7$ ohms per square inch at 42% relative humidity. A similar anticurl backing prepared from gelatin had a resistivity of approximately $1 \times 10^{11}$ ohms per square inch.

This coating was repeated on polyethylene-coated paper stock. The resistivity after aging for one week was $8.1 \times 10^7$ ohms per square inch.

*Example 8*

Starting with the aqueous dope described in Example 4, a coating solution was prepared consisting of an aqueous solution containing 5% of the sodium salt of carboxy butyl ester-lactone of maleic anhydride-vinyl acetate interpolymer, 0.15% of tris-[1-(2-methylaziridinyl)]phosphine oxide as a hardener therein and 0.05% of p-tert.-octylphenoxyethoxyethyl sodium sulfonate. The pH of the solution was adjusted to 7 and the solution was coated onto gel-subbed triacetate film support as described in Example 4. This support was then overcoated with a photographic emulsion and was compared with a like product containing no antistatic layer as a control. The electrical surface resistivity of the film having an antistatic layer in accordance with the invention was $0.2 \times 10^{10}$ ohms per square inch, whereas the control product had a surface resistivity of $77 \times 10^{10}$ ohms per square inch. The resistivity was measured at 50% relative humidity.

*Example 9*

A coating solution identical to that described in the preceding example was prepared and coated on both sides of a gel-subbed cellulose acetate butyrate film base. This film base was coated on both sides with a photographic silver halide emulsion and a control product was prepared being identical except that the antistatic coatings were omitted. The two products were aged for seven days at 77° F. and 50% relative humidity. The coatings in each case had good appearance and excellent wet and dry adhesion. The surface resistivity of the film which had the antistatic coating in accordance with our invention was $0.002 \times 10^{10}$ ohms per square inch, while that of the control film was $7 \times 10^{10}$ ohms per square inch, all values having been measured at 50% relative humidity.

If desired, other hardeners than those specified in the examples may be employed such as, for example, butane-1,4-diol bis(glycidyl ether), vinylcyclohexene dioxide, resorcinol bis-(glycidyl ether), bis[2,3-epoxypropyl]propyl amine, or bis[2,3-epoxypropyl]ethylmethylammonium p-toluenesulfonate.

*Example 10*

A. A celulose triacetate film support was coated with an antihalation layer in the form of a dyed gelatin layer at the rate of 1750 mg. of gelatin per square foot. This layer was then overcoated with a layer of the sodium salt of carboxy butyl esterlactone of the interpolymer of maleic anhydride-vinyl acetate at the rate of 0.150 gram per square foot.

B. A silver bromoiodide-gelatin photographic emulsion on a cellulose triacetate film support was overcoated with a layer of sodium salt of carboxy butyl ester-lactone of the interpolymer of maleic anhydride and vinyl acetate at the rate of 0.082 gram thereof per square foot. Surface electrical resistivity measurements were made of these products both before and after coating with the static resistant layer. The results at 20% relative humidity and 70° F. were as follows:

| | Resistivity ($\times 10^{10}$ ohms/sq. in.) |
|---|---|
| Gelatin layer alone | 680 |
| Gelatin layer overcoated with antistatic layer | 150 |
| Emulsion layer alone (480 mg. Ag and 525 mg. gelatin/sq. ft.) | 20,000 |
| Emulsion layer overcoated with antistatic layer | 1,000 |

*Example 11*

An antistatic layer composed of a mixture of sodium salt of carboxy butyl ester-lactone of the interpolymer of maleic anhydride-vinyl acetate, hexamethylene 1,6-bis[3,3-ethylene urea] as a hardener, and gelatin was coated onto a cellulose triacetate film support, which layer was overcoated with a silver bromoiodide-gelatin photographic emulsion. The antistatic layer was composed of equal parts of gelatin and the conducting sodium salt and 3% hardener based on the weight of the latter. A similar product was prepared but with the antistatic layer omitted. Tests were made of these two products at 20% relative humidity and 70° F. to determine surface electrical resistivity. The results obtained were as follows:

| | Resistivity ($\times 10^{10}$ ohms/sq. in.) |
|---|---|
| Silver bromoiodide-gelatin emulsion layer | 1,200 |
| Silver bromoiodide-gelatin emulsion coated over a layer containing 114 mg. gelatin + 114 mg. antistatic salt | 14 |

*Example 12*

Sodium salt of carboxy butyl ester-lactone of the interpolymer of maleic anhydride-vinyl acetate was added to a silver bromoiodide-gelatin photographic emulsion in an amount 16% of the weight of the gelatin present. A layer of this emulsion was applied on a cellulose triacetate film support and a gelatin overcoat was applied thereto. Determination of the surface resistivity of this product compared with a photographic film resulting from applying a layer of conventional silver bromoiodide-gelatin photographic emulsion on cellulose triacetate film support gave the following results at 20% relative humidity and 70° F:

| | Resistivity ($\times 10^{10}$ ohms/sq. in.) |
|---|---|
| Emulsion layer (750 mg. Ag and 1440 mg. gelatin/sq. ft.) | 1,340 |
| Emulsion layer + 215 mg. antistatic salt/sq. ft. overcoated with a gelatin layer (83 mg. gelatin/sq. ft.) | 104 |

*Example 13*

A photographic negative was dip coated in a three percent aqueous solution of the sodium salt of the carboxy butyl ester-lactone of the present invention which had been adjusted to a pH of 7 and contained 0.05% of iso-octylphenoxypolyethoxyethanol to improve flow properties. After drying in a current of warm air, the emulsion side of the negative had a surface resistivity of $2.0 \times 10^9$ ohms per square inch and the peloid side had a surface resistivity of $2.6 \times 10^8$ ohms per square inch at 50% relative humidity. Both sides of a control which was not coated had surface resistivities of $4 \times 10^{12}$ ohms per square inch.

While the conducting salts of the previous examples have been those of carboxy butyl ester-lactones prepared from the vinyl acetate-maleic anhydride interpolymer, glycolic acid, and n-butyl alcohol, similar conducting layers may be obtained with the salts of similar carboxy ester-lactones prepared from other polymers, hydroxy acids and alcohols as described in U.S. Patent No. 3,007,901 of Louis M. Minsk.

Other related carboxy ester-lactone polymers which give salts that provide equally effective conducting layers have been made in the following manner. A mixture of 200 g. of vinyl acetate-maleic anhydride interpolymer, $\eta = .23$ (the inherent viscosity of the vinyl acetate-maleic anhydride intermediate used here should be no more than about 0.25 measured in acetone solution comprising 0.25 gram of polymer per 100 ml. of solution to inhibit serious cross-linking), 600 ml. of distilled water, and 70 ml. of n-butyl alcohol were stirred until solution occurred. To this was added 68 ml. of concentrated sulfuric acid, and the solution was heated on a steam bath for approximately 20 hours. During this time the carboxy butyl ester lactone separated from solution as a solid. This was transferred to a sigma-bladed mixer and milled in repeated changes of water to harden and break up the polymer and reduce the acidity. The last traces of acid were removed by washing several times with rapid stirring and filtering the sample after each wash. After drying in a 40° oven, 150 g. of polymer were obtained which had a carboxyl content of 5.18 milliequivalents per gram of polymer. Carboxy ester lactones of higher or lower carboxyl content are obtained by employing smaller or larger amounts of alcohol in the reaction. These carboxy-containing polymers are converted to their alkali metal or ammonium salts in the usual manner. The above-described polymer was converted to its sodium salt and coated on paper from a five percent aqueous solution containing three percent based on the weight of the polymer of the aziridine hardener, hexamethylene-1,6-bis[3,3-ethylene urea], and having a pH of 7 at the rate of 2.5 grams per square meter. After hardening for three days at room temperature, the coating had a resistivity of $4 \times 10^8$ ohms per square inch at 20% relative humidity.

The usefulness of carboxy ester-lactone polymers prepared as described in the preceding paragraph depends upon the inherent viscosity of the interpolymer used as the intermediate in its preparation. It has been found that this alpha-beta-unsaturated dicarboxylic acid-vinyl ester interpolymer intermediate should have an inherent viscosity of not exceeding approximately 0.25 measured in acetone solution comprising 0.25 gram of polymer per 100 ml. of solution for making a desirable product in which serious cross-linking is avoided. The making of these useful carboxy ester lactones by reacting a low viscosity intermediate with a lower alkanol under aqueous acid conditions is not our invention but is the invention of Louis M. Minsk and Edward P. Abel described and claimed in their application Serial No. 304,676. The term "vinyl" when used generically refers to both unsubstituted and substituted vinyl groups.

We claim:

1. A photographic film comprising film base having on one side a layer composed of 15–100% of a water-soluble salt of a carboxy ester-lactone of an interpolymer of (1) an unsaturated alpha-beta-dicarboxylic acid and (2) a vinyl ester of a carboxylic acid, which salt is 25–98% neutralized and on the other side a gelatin-silver halide photographic emulsion layer.

2. A photographic film comprising cellulose triacetate film base having on one side a layer composed of an alkali metal salt of a carboxy ester-lactone of an interpolymer of (1) an unsaturated alpha-beta-dicarboxylic acid and (2) a vinyl ester of a carboxylic acid which salt is 25–98% neutralized and on the other side a gelatin-silver halide photographic emulsion layer.

3. A photographic film comprising film base having on one side a layer composed of an alkali metal salt of a carboxy ester-lactone of an interpolymer of (1) an unsaturated alpha-beta-dicarboxylic acid and (2) a vinyl ester of a carboxylic acid, which salt is 25–98% neutralized and on the other side a gelatin-silver halide photographic emulsion layer.

4. A photographic film comprising film base, a gelatin-silver halide photographic emulsion layer and thereover a layer composed of 15–100% of a water-soluble salt of a carboxy ester-lactone of an interpolymer of (1) an unsaturated alpha-beta dicarboxylic acid and (2) a vinyl ester of a carboxylic acid, which salt is 25–98% neutralized.

5. A photographic film comprising a base having thereon light sensitive silver halide-gelatin photographic emulsion and antistatic agent, said antistatic agent being a water soluble salt having been prepared by 25–98% neutralization of a carboxy ester lactone of (1) an unsaturated alpha-beta dicarboxylic acid and (2) a vinyl ester of carboxylic acid, said carboxy ester lactone having had a usable carboxy content between approximately 3.5 and 6 milliequivalents per gram of polymer.

6. A photographic film comprising a base, a light sensitive silver halide-gelatin photogaphic emulsion layer and an antistatic layer containing gelatin and an antistatic agent, said antistatic agent being a water soluble salt having been prepared by 25–98% neutralization of a carboxy ester-lactone of (1) an unsaturated alpha-beta dicarboxylic acid and (2) a vinyl ester of carboxylic acid, said carboxy ester lactone having had a usable carboxy content between approximately 3.5 and 6 milliequivalents per gram of polymer.

7. A photographic film comprising a base having thereon light sensitive silver halide-gelatin photographic emulsion and antistatic agent, said antistatic agent being the sodium salt which resulted from 25–98% neutralizing with a sodium base of a carboxy ester lactone of maleic anhydride-vinyl acetate interpolymer, said carboxy ester lactone having had a usable carboxy content between approximately 3.5 and 6 milliequivalents per gram of polymer.

8. A photographic film comprising a base, a subbing coating containing an antistatic agent and thereover a light sensitive silver halide-gelatin photographic emulsion layer, said antistatic agent being the sodium salt which resulted from 25–98% neutralization with a sodium base of a carboxy butyl ester-lactone of maleic anhydride-vinyl acetate interpolymer, said carboxy butyl ester lactone having had a usable carboxyl content between approximately 3.5 and 6 milliequivalents per gram of polymer.

9. A photographic film comprising a base, a light sensitive silver halide-gelatin photographic emulsion layer and an antistatic layer containing an antistatic agent and a hardener, said antistatic agent being a water soluble salt having been prepared by 25–98% neutralizing a carboxy ester lactone of an interpolymer of (1) an unsaturated alpha-beta dicarboxylic acid and (2) a vinyl ester of a carboxylic acid, said carboxy ester lactone having had a usable carboxy content between approximately 3.5 and 6 milliequivalents per gram of polymer.

10. A photographic film comprising a base, a light sensitive silver halide photographic emulsion and an antistatic layer containing an antistatic agent and a polyepoxide hardener, said antistatic layer being the sodium salt resulting from the 25–98% neutralizing of a carboxy butyl ester-lactone of maleic anhydride-vinyl acetate polymer, said carboxy ester lactone having had a usable carboxy content between approximately 3.5 and 6 milliequivalents per gram of polymer.

References Cited by the Examiner

UNITED STATES PATENTS

| | | | |
|---|---|---|---|
| 2,074,647 | 3/37 | Hagedorn et al. | |
| 2,360,947 | 10/44 | Hershberger | 117—145 |
| 2,717,834 | 9/55 | Saner | 96—87 |
| 2,725,297 | 11/55 | Morey | 96—87 |
| 2,763,578 | 9/56 | Simons | 117—145 |
| 3,007,901 | 11/61 | Minsk | 96—84 X |
| 3,102,028 | 8/63 | Minsk | 96—83 |

NORMAN G. TORCHIN, *Primary Examiner.*